Jan. 4, 1949.  E. H. LAND  2,458,179
ANTIGLARE SYSTEM FOR AUTOMOTIVE VEHICLES
EMPLOYING POLARIZED LIGHT
Filed July 8, 1946  3 Sheets-Sheet 1
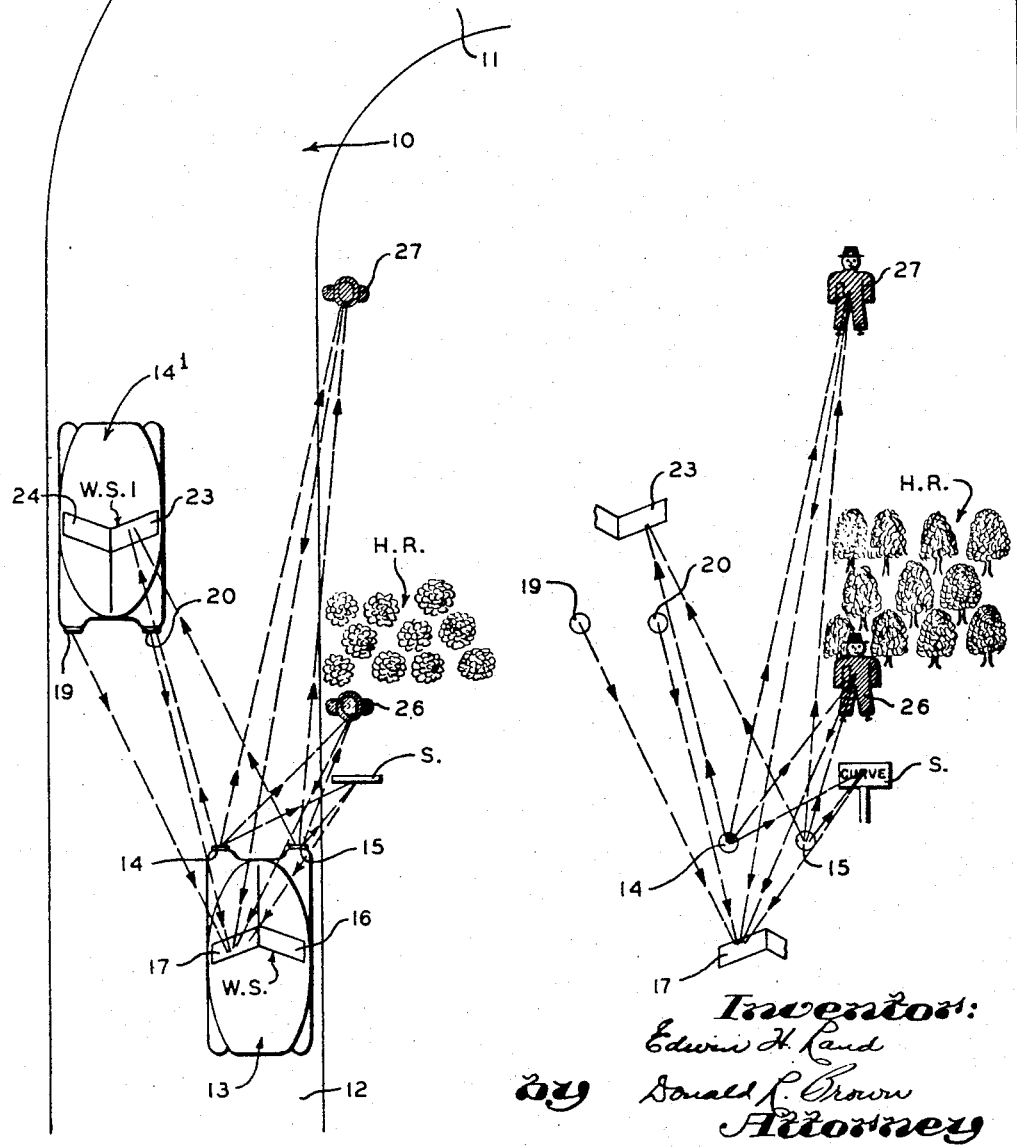

Inventors:
Edwin H. Land
by Donald L. Brown
Attorney

Jan. 4, 1949. E. H. LAND 2,458,179
ANTIGLARE SYSTEM FOR AUTOMOTIVE VEHICLES
EMPLOYING POLARIZED LIGHT
Filed July 8, 1946 3 Sheets-Sheet 3

Inventors:
Edwin H. Land
by Donald L. Brown
Attorney

Patented Jan. 4, 1949

2,458,179

UNITED STATES PATENT OFFICE 2,458,179

ANTIGLARE SYSTEM FOR AUTOMOTIVE VEHICLES EMPLOYING POLARIZED LIGHT

Edwin H. Land, Cambridge, Mass., assignor to Polaroid Corporation, Cambridge, Mass., a corporation of Delaware Application July 8, 1946, Serial No. 681,922

4 Claims. (Cl. 88—1)

This invention relates to improved systems for illuminating automotive vehicles and the like wherein headlight glare is reduced or eliminated by employing polarized sources of illumination and suitable light-polarizing viewing analyzers.

Objects of the invention are to provide a system of the character described wherein the transmission axis of the polarizing analyzer of each vehicle makes an acute angle with the vibration direction of light emitted from the polarizing headlights of the said vehicle, and, more specifically, where the said angle is at least 20° and at most 45°, whereby polarized light emitted from the headlights of the said vehicle and reflected back through the viewing visor thereof without depolarization is substantially transmitted by said visor; to provide such a system wherein the light-polarizing elements are so positioned that polarized light emitted from the headlights of a similarly equipped approaching vehicle will be so transmitted by the windshield of the first-mentioned vehicle as to reduce to a minimum the intensity of the ghost image of the approaching headlights seen by the driver of the first-mentioned vehicle; to provide such a system wherein the polarizing analyzers of approaching vehicles will be so positioned with respect to one another that the transmission axes thereof will make angles with one another not exceeding 70°; and to provide such a system wherein the transmission axis of the polarizing analyzer of any vehicle makes an angle of at least 55° with the horizontal whereby a substantial amount of horizontally vibrating polarized light may be blocked by said analyzer.

The above and other objects, purposes, and novel and characteristic features of this invention will in part appear, and in part be obvious from the following detailed description, when taken in connection with the accompanying drawings; it being expressly understood, however, that the drawings are solely for the purpose of illustration and are, in no manner whatsoever, intended as a definition of the limits of the invention, reference being primarily had, for defining and limiting the invention, to the appended claims.

In the drawings, wherein like reference characters refer throughout to like parts in the several views:

Figure 1 is a wholly schematic plan view of this invention as particularly applicable to a situation here depicted;

Fig. 2 is a view similar to, but somewhat more schematic than, Fig. 1;

Figure 3:
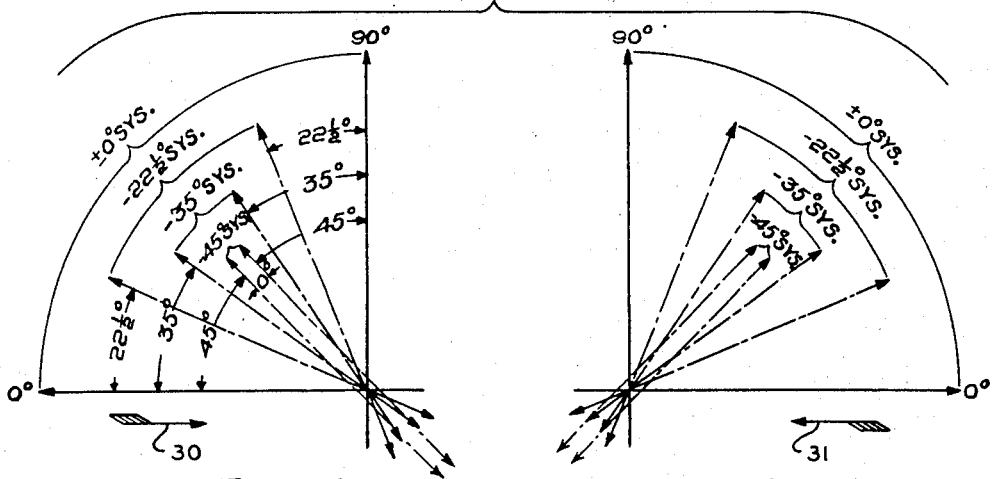
Fig. 3 is a wholly diagrammatic view of systems in accordance with Fig. 1.

Referring now to the drawings, and first to Figs. 1 and 2, there is here illustrated a highway, designated generally as 10, and comprising a curved portion 11, and a tangent portion 12, with two vehicles, designated generally as 13 and 14¹, approaching each other from opposite directions, on tangent portion 12, of the highway. These vehicles are here shown, merely by way of example, and in order to illustrate one of the many situations in which applicant's improved system may be employed to manifest advantage.

The two vehicles 13 and 14¹, here shown as automotive vehicles, are equipped in like manner, in accordance with the present invention. Each vehicle, as vehicle 13, has a usual set of headlights, 14 and 15, a usual present-day divided type of windshield, designated generally as W. S., and comprising the usual two portions 16 and 17, portion 17 being that behind which the driver sits, and portion 16 that behind which the front-seat passenger, or passengers sit. The other vehicle, 14¹, as shown here, has like headlights 19 and 20, and a like windshield W. S. 1, having a driver's portion 23, and a front-seat passenger portion 24.

As shown in the drawing, each of the two separate portions of each windshield, is individually tilted rearwardly and toed or cambered rearwardly in usual manner as with present-day windshields. The tilting is effected about a substantially horizontal axis and through various angular distances as measured from a vertical plane. In practice, however, the tilt-back angle is of the general order of 37°.

The toe-back is effected about a substantially vertical axis with the outer vertical edge of the portion moved rearwardly of the vehicle, and while the toe-back angle, as measured from a plane transverse of the length of the vehicle, may vary somewhat in practice, it is, generally, of the order of about 12°.

The showing in Figs. 1 and 2 also includes a wayside sign, S, of any unusual or desired construction and with any desired indicia thereon, as, in the present case, the word "Curve," and this sign, as is generally the usual practice, preferably has a surface character such as to reflect largely specularly, a large percentage of all light incident thereon, it being understood that specular reflection is such type of reflection as to leave substantially unchanged the original polarization characteristics of the incident polarized light.

Also shown in these figures of drawing, are two separate objects 26 and 27, differently spaced from, and in front of, vehicle 13, which vehicle, for convenience in description, may be referred to hereinafter as one's "own" vehicle, or as the "own" vehicle. Objects 26 and 27 are here illustrated as pedestrians, and, as indicated by the cross hatching thereof, they are clothed in very dark, or even black, clothing whereby to possess relatively low reflective powers, and hence, to be of relatively low visibility as viewed by an occupant of vehicle 13. Accordingly, objects 26 and 27 may be conveniently referred to hereinafter as "marginal black" objects or figures, and are to be understood as being representative of relatively dangerous driving hazards.

Object 26, as shown, is immediately in front of a background H. R. possessing relatively high reflective powers, and may be, for example, constituted of clumps of low-lying bushes, foliage, or the like, of relatively smooth surface and green hue. Marginal black object 26 is, therefore, viewed as by an occupant of vehicle 13, and more pertinently as by a driver of vehicle 13, as against a relatively highly reflective background.

Marginal black object 27 is shown as in front of background L. R., of relatively low reflective powers and distantly spaced from this object, and, as here illustrated, this background may comprise a group of tree trunks. It should be noted that while marginal black object 26 is positioned immediately in front of its background H. R., marginal black object 27 is very considerably spaced from its background L. R. For example, background H. R. may be considered as spaced by a distance of one unit from the headlights of vehicle 13, object 27 as spaced a distance of four units from these headlights, and distant background L. R. spaced a distance of eight units from such headlights. These various stated distances are, of course, somewhat arbitrarily chosen and are to be considered in no manner whatsoever of a limiting nature, though the relative distances do have a significance, as appears more fully hereinafter as this description progresses, in bringing out the many advantages inherent in this invention.

Referring now to Fig. 3, a polarized antiglare headlighting system for vehicles is shown, wherein the diagrammatic showing at the left of the figure includes a "0°" axis, and a "90°" axis, and relates to the equipment for one's own vehicle 13. The corresponding showing at the right of this figure relates to the equipment for the opposing and approaching vehicle 14¹. Arrows 30 and 31 designate relative orientation, and directions of travel, of the vehicles 13 and 14¹, respectively. The various systems here illustrated, and both as shown at the right, and the left, portions, of this figure, are all to be considered as viewed ahead from the position of the driver of the "own" vehicle 13, unless otherwise specifically designated.

Before proceeding further with a detailed description of the operation of the various systems shown in Fig. 3, it may well be expedient to explain that the headlights include light polarizing means, which polarizing means may be constituted in any manner suitable for the performance of its contemplated function.

Thus, this polarizing means may comprise any suitable sheet-like type of polarizer, such as disclosed in the United States Patent 2,173,304, issued to Land and Rogers. Further, windshields W. S. and W. S. 1 include light polarizing means which may be the same as that, above described, for the headlights, and also, and more specifically and preferably, such as disclosed in the United States Patent 2,237,567, issued to Land.

The windshield itself may in part, or in whole, function as the analyzer, or the analyzer may be constituted by a member separate from the windshield such as a drop flap, or other type, visor positioned either to the rear, or in front, of the windshield, or by eyeglasses, goggles and the like worn by a driver of the vehicle. While at least a sufficiently large driver's portion of the windshield is illustrated in Figs. 1 and 2 as functioning as the analyzer, it may be expedient at times to incorporate analyzer function in more or less of the windshield area, or incorporate such function in a physically separate means such as a conveniently controllable drop-flap, or other, type of visor positioned either to the rear, or in front, of an associated windshield and so arranged as to intercept a forward line of sight of a seated driver. Furthermore any other usual or suitable analyzer means may well be employed so long as it fulfills the various requirements of this invention as so far, or as hereinafter, described.

Returning now to a further consideration of Fig. 3 and first considering the left-hand portion thereof, the several antiglare systems there illustrated are all identical insofar as each may accurately be diagrammatically represented by two arrows representing respectively the two transmission axes of the two light polarizing means employed, and also representing the two vibration directions of light as, and if, plane polarized by the light polarizing means. In the case of each system, the arrow nearer a vertical line, as the vertical axis 90° represents the transmission axis of the analyzer, and the other arrow which is nearer a horizontal line, as the horizontal axis 0° represents the transmission axis of the polarizing headlight or headlights, it being clear that the scope of the description and of the claims is in no way affected by the number of headlights recited. Each pair of arrows representing the two transmission axes of a system is symmetrically positioned within a quadrant, and, more inclusively, within two diagonally adjacent quadrants as defined by intersecting horizontal and vertical lines or axes. Also in each case, the system is designated quantitatively, as 35°, 22½°, etc., by the size of the angle between the analyzer transmission axis and the vertical, as axis 90°, and in sign, as either "positive (+)", or "negative (—)" accordingly as the two transmission axes extend, respectively, from upper right to lower left, or from upper left to lower right, as, in each case, viewed ahead by a driver in the driver's seat.

The system sign designation may also be conveniently referenced to a clock face, the positive (+) system being one having its two transmission axes lying within the areas defined by 12–3, and 6–9 o'clock, and the negative (—) system being one having its two transmission axes lying within the areas defined by 9–12, and 3–6 o'clock.

From the above, a complete understanding of what is shown in Fig. 3 should be largely obvious.

The system of Fig. 3, designated as "—45° Sys." is one in which the two transmission axes thereof make equal angles of 45° each, with the vertical and horizontal axes 90° and 0°, are therefore coincidental, and extend from upper left to lower right when viewed as defined above, with the axis of the analyzer (in this one case) as near to the vertical as is the other axis.

The system of Fig. 3 designated as "—35° Sys." is one in which the two transmission axes thereof make equal angles of 35° each, with the vertical and horizontal axes 90° and 0°, are therefore at an angle of 20° to each other, and extend from upper left to lower right when viewed as defined above, with the axis of the analyzer the nearer the vertical.

The system of Fig. 3 designated as "—22½° Sys." is one in which the two transmission axes thereof make equal angles of 22½° each, with the vertical and horizontal axes 90° and 0°, are therefore at an angle of 45° to each other, and extend from upper left to lower right when viewed as defined above, with the axis of the analyzer the nearer the vertical.

The system of Fig. 3 designated as "±0° Sys." is one in which the two transmission axes thereof make equal angles of 0° each, with the vertical and horizontal axes 90° and 0°, are therefore at an angle of 90° to each other, with the axis of the analyzer vertical.

The representation at the right-hand portion of Fig. 3 is as above described, it merely being important to bear in mind that the vehicle $14^1$ is rotated 180° with respect to vehicle 13.

Figure 4:
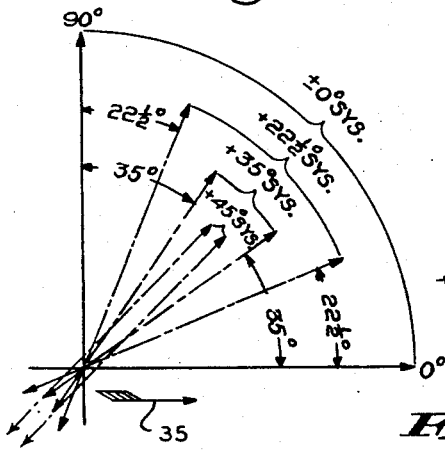
Fig. 4 is a fragmentary view, similar to Fig. 3, of a modified form of this invention.

Referring now to Fig. 4, there is here represented much the same several polarized antiglare headlighting systems as disclosed in Fig. 3, and differing therefrom only in sign, they being positive (+) systems rather than negative (—) systems as in Fig. 3. This Fig. 4 differs from the right-hand portion of Fig. 3 only in that its vehicle direction arrow 35 is of opposite sense to that of arrow 31 of Fig. 3.

Figure 5:
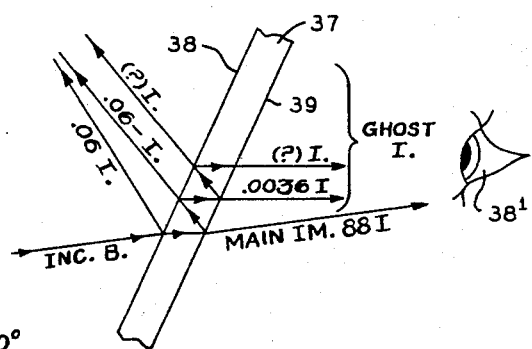
Fig. 5 is a diagrammatic view illustrating formation of "ghost" images, as concerns this invention.

Referring now to Fig. 5, there is here illustrated, the behavior of a light beam incident, out of normal, on a plane surface such as a face of a windshield, which latter, for present purposes, may be considered to have plane parallel front and rear faces and which, for the purposes of the present discussion, may be considered to be tilted back from the vertical by an angle of approximately 37°, each section of the windshield being toed back by an angle of about 12° in accordance with the conventional practice hereinbefore referred to. An incident beam "Inc. B." may be considered to be a beam of plane polarized light as emanating from a source of plane polarized light as from the vehicle headlight 15, and windshield 37 may be considered such as the portion 23 of windshield W. S. 1 (see Figs. 1 and 2). Behind windshield 37 is a representation of an eye $38^1$ to represent an observer, such as a driver of vehicle $14^1$. In practice, if windshield 37 should not serve as an analyzer, an analyzer (not shown) would be positioned between eye $38^1$ and windshield 37.

Beam "Inc. B." upon striking outer face 38, is partly reflected therefrom as the primary reflected beam ".06 I," and is partly transmitted through the windshield as the transmitted main image beam "Main Im. 88 I" which, under the conditions depicted includes light flux equal approximately to 0.88 of that of incident beam "Inc. B." Secondary, tertiary, etc., internally reflected beams ".06 I," "(?) I," etc. are directed forwardly away from $38^1$ and include only about .06 of the light flux of the incident beam, and this represents only wasted light that can be compensated for by added incident flux.

Secondary, tertiary, etc., inwardly directed internally reflected beams ".0036 I.," "(?) I.," etc., produce, in the aggregate, what is generally and conveniently termed, in this particular art, the "ghost" image. This ghost image is of very low intensity as compared with the intensity of the main image. Due, however, to the successive reflections from the parallel plane windshield internal surfaces, the original polarization characteristics of this "ghost" light flux are altered to a greater or lesser degree by rotation of the vibration direction thereof. Thus, despite the low relative intensity of the ghost light flux, since a very large percentage of this "ghost" light flux may "leak" through the analyzer, this "ghost" light flux may produce very harmful glare to a driver.

This ghost image exists regardless of whether the windshield has parallel plane outer faces, or is of a wedge shape and varies directly with the size of the angle of incidence. This ghost image may sometimes be superimposed on the main image, and sometimes be displaced therefrom, but in every case the polarization characteristics of the light constituting the ghost image are more or less altered in character from those of the incident beam and those of the main image light. Hence, they always interfere with the proper and contemplated functioning of the analyzer.

In the seeing of an object along the roadway, and particularly such as the seeing of a marginal black object (Fig. 1), where the total light from one's own headlights and incident on the front face of one's windshield is only of the order of about 4% of the light incident on the object and originating from one's own headlights, this ghost image is quantitatively so small that it may be ignored in practice.

However, in considering elimination of glare to a driver due to the direct beams from headlights of an approaching opposed vehicle, the quantitative value of the ghost image is sufficiently great to be of major importance, and may produce sufficient leakage through an analyzer as to result in very harmful and dangerous glare effects.

For the purposes of clear understanding of the present disclosure, it should wholly suffice to clearly bear in mind that when the vibration direction of incident plane polarized light is either parallel with, or at right angles to, the plane of incidence of such incident light, no change in the polarization characteristics of the light emerging from the rear face of the windshield takes place and, hence, though a ghost image, either superimposed on, or spaced from, the main image is produced, it is not harmful since it lends itself to as complete extinction by the analyzer as does the main image.

Figure 6:
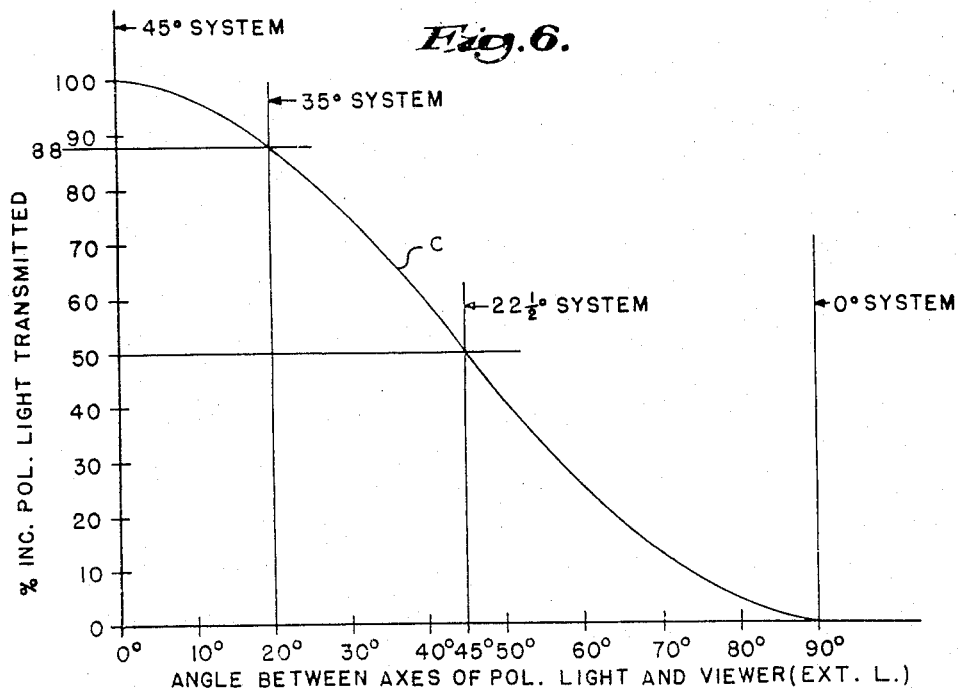
Fig. 6 is a curve of ratios of percentages of incident light transmitted by a polariscope arrangement, to angular relationships of polarizer and analyzer transmission axes.

Referring now to Fig. 6, curve C thereof is derived by plotting, along a vertical axis, the theoretical percentage of analyzer transmitted polarized light incident on the analyzer against the corresponding angle, in degrees, along a horizontal axis, between the vibration direction of the incident light and the transmission axis of the analyzer. It assumes, therefore, complete transmission and complete extinction at angles of 0° and 90°, respectively.

From this curve it is obvious that various antiglare systems, as are indicated in this Fig. 6 as the "45° System," the "35° System," the "22½° System," and the "0° System" are characterized by fixed "angular" values of, respectively, 0°, 20°, 45°, and 90°. Furthermore, from this Fig. 6 it is readily seen that the theoretical percentage of transmission of unaltered polarized light from one's own headlights and incident on one's own analyzer is, for the systems 45°, 35°, 22½°, and 0° approximately, respectively, 100%, 88%, 50%, and 0%.

Figure 7:
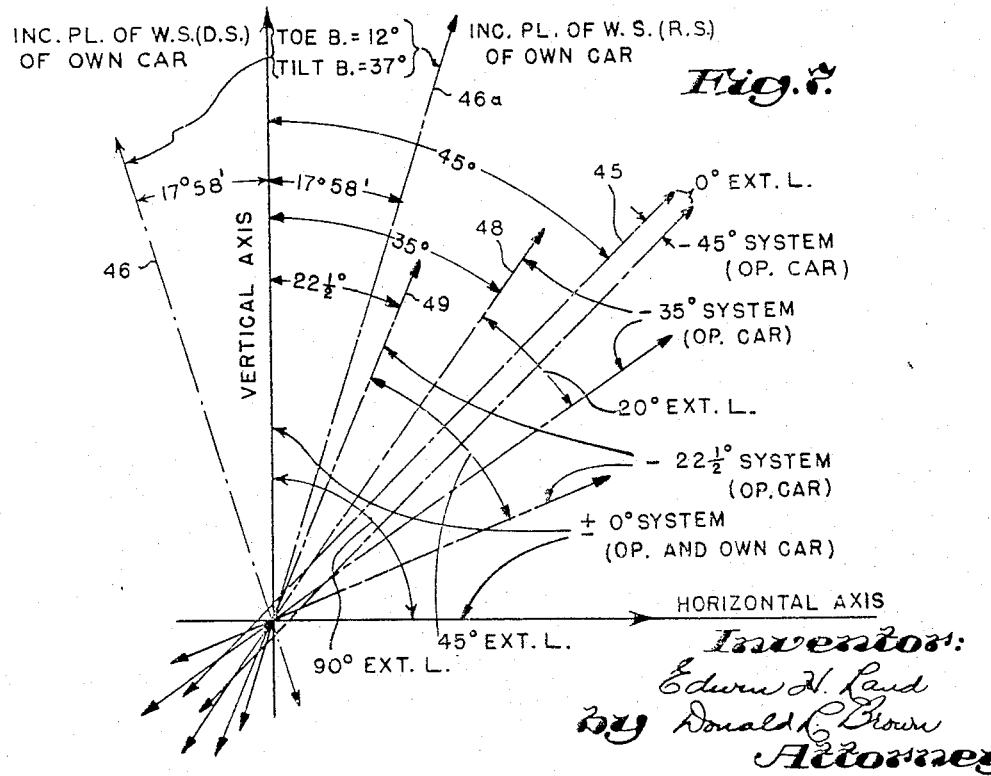
Fig. 7 is a wholly diagrammatic view showing such systems as applied to one's "own" vehicle as approached from the opposite direction, by an opposed like-equipped vehicle.

Referring now to Fig. 7, there is here represented the vibration directions of light beams as emanating from headlights in accordance with the various antiglare systems above described and the transmission axes of the corresponding analyzers, as carried on vehicle 14¹, together with the planes of incidence 46a and 46 of such beams on the portions 16 and 17 of windshield W. S. of vehicle 13 and viewed in a forward direction from behind windshield W. S.

It may, of course, be properly assumed that incident light, largely regardless of from whence it may originate, is incident on the windshield portions from substantially a constant direction, since, with light sources spaced at any considerable distance from the windshield, this is substantially the case.

As may be readily appreciated, in each system there is a definite and characteristic "angle of extinction" as in the 35° system, (+ or —) this angle, designated as "20° Ext. L.," is a 20° angle and is, of course, the angle between the transmission axes of the headlight and analyzer polarizing means. This angle is significant, as is readily apparent from Fig. 6 and, in the case of the 35° system, it indicates that a driver can see wayside objects, as illuminated by his own headlights with relatively high visibility since approximately 88% of the polarized light from his headlights which is returned unaltered in polarization characteristics by an object is transmitted to him through his analyzer. In the 45° system (+ or —) such visibility is slightly greater, as in the ratio of about 100 to 88, while in the 22° system, (+ or —) it is substantially one half as great as in the 45° system.

It should also be noted that the size of the extinction angle characteristic of any system is a measure of the degree of "blacking out" of an opposing vehicle's analyzer as viewed through one's own analyzer, the "blacking out" effect varying inversely as the size of this angle.

With regard to minimizing the interference to contemplated and desired analyzer operation producible, at times, by ghost images, and bearing in mind that such ghost interference is completely obviated when the vibration direction of polarized incident light is parallel, or perpendicular, to the plane of incidence, it is to be seen that the —45° system has its light vibration direction at an angle of about 63° to the incident plane, the —35° system at an angle of about 73°, while the —22½° system more closely approaches the optimum of 90°, by having an angle of about 85½°, the said incident plane being 46 of Fig. 7.

In the ±0° system, the extinction angle is equal to 90°, while the vibration direction of the polarized light in this system makes an angle of 90° plus or minus about 18°.

After having considered the various systems and particularly the —22½°, and —45° systems, it would seem expedient to consider them as regards their influences on the relative visibilities of various roadside hazards, and more particularly, on such hazards as so-called marginal black objects as 26 and 27 (Figs. 1 and 2).

It is, of course, understood that in all polarized headlighting systems the analyzer transmits about one half of all nonpolarized or dispersed light which is incident thereon, while it transmits polarized incident light to varying extents as dependent on the angle made by the vibration direction of the incident light with the transmission axis of the analyzer, as shown by curve C of Fig. 6.

A so-called "black object," as, for example, a pedestrian wearing a dark, or black suit, reflects about 4% of light incident thereon, and, of course, absorbs or transmits the rest of the incident light. Of this reflected 4%, substantially all retains its original characteristics, whereby, if the incident light be polarized with given characteristics, this 4% reflected light is substantially unchanged in polarization characteristics.

On the other hand, in the case of relatively light-colored objects, as pedestrians in white, or light-colored clothing, or in the case of the background H. R. (of Figs. 1 and 2), about 70% of light incident thereon is reflected therefrom, with the remainder either absorbed or transmitted. Of this 70% of reflected incident light, about 6 parts thereof, (i. e., 4% of the incident light), is reflected without substantial change in characteristics, whereby, if the incident light be polarized, this reflected portion retains the original polarization characteristics. The remaining reflected light, of the order of 64% of the incident light, is reflected as completely dispersed, or substantially completely depolarized, light.

The marginal black figure 27, is should be remembered, is viewed by a driver of vehicle 13 as against background L. R., of low reflective character, whereby substantially no light is reflected from it to be incident on the analyzer of vehicle 13.

With the above considerations, and the curve of Fig. 6, in mind, it can be readily appreciated that the —45° system (extinction angle of 0°) and the —35° system (extinction angle of 20°) are both most efficient in regard to visibility of roadway objects illuminated by one's own headlights and viewed by a driver through his analyzer. This also holds good as regards objects such as the marginal black object 27 which is viewed against a relatively far distant, and relatively low reflective, background. With either the —35° system, or the —45° system, the visibility of such a marginal object 27 is substantially at a maximum.

It should be distinctly understood, that in referring to a system as the "—35°" system, there is no intention whatsoever of limiting such system to this, or any other, exact number of degrees, as obviously a slight variation on either side thereof, of a few degrees, may well be indicated by circumstances.

There well may occur such situations as to indicate the desirability of some particular system, as, possibly the one illustrated in Figs. 1 and 2 by marginal object 26 adjacent the highly reflective background H. R. as viewed from vehicle 13 by the driver as he sights through his analyzer. Marginal figure 26 tends, in general, to appear as a somewhat dark object, against a none too light background, and hence, due to lack of contrast, it is but poorly visible.

By materially reducing the brightness of the object, without at the same time greatly changing the brightness of the background, the resulting contrast makes the object become more highly visible to an observer. This may readily be accomplished by the use of the —22½° system, whereby the brightness of the object 26 is roughly cut in half, while the brightness of the background is not materially decreased, as follows from the above disclosure.

A desirable feature of the —22½° system may be readily appreciated by considering that drivers of vehicles are accustomed to such a ratio of brightnesses of various objects as has been experienced over long periods of time, under conditions prevailing with usual and nonpolarized lighting. Any undue, and unaccustomed, brightness of specularly reflecting objects, such as road-signs, as compared with nonspecularly reflecting objects, such as tree trunks and the like, is so contrary to experience as to be dangerous, and well may be so disconcerting as to contribute largely to serious accidents. As a specific example, consider that a ridge or hollow across a roadway which is smooth and shiny, as when wet and thus highly and specularly reflective, may under certain conditions appear unduly, and confusingly, bright as compared to the remainder of the roadway.

When viewed in a —22½° system, however, wherein both specularly, and nonspecularly, reflected light incident on one's own analyzer and originating from one's own headlights, are transmitted by the analyzer to an extent of substantially 50%, no undue relative brightnesses, or lighting unbalance, can well exist.

eral has been considered, and more specifically, plane polarized light. This invention is in no way limited to the use of plane polarized light as distinguished from elliptic polarized light, and it is to be distinctly understood that this invention may be practiced with the use of elliptic polarized light and fully realize the many advantageous features of the invention.

Figure 8:
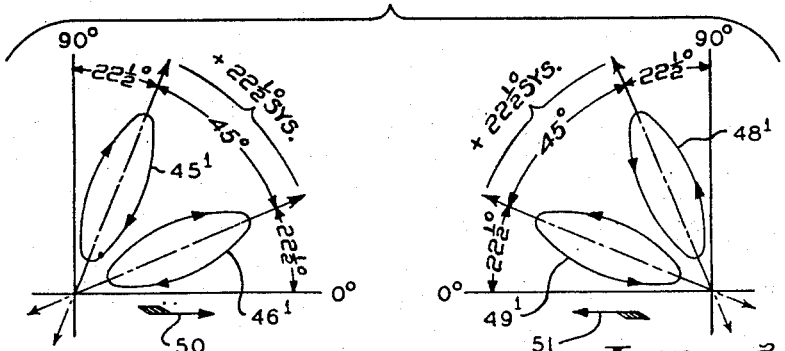
Fig. 8 is a view similar to Fig. 3, of such invention, as employing elliptic polarized light.

The use of elliptic polarized light in this invention is illustrated in Fig. 8 in connection with a +22½° system. This figure is given solely by way of example, as all forms of this invention may advantageously employ elliptic polarized light. In this Fig. 8, ellipses 45¹ and 46¹ represent the vibration axes of the analyzer and polarizing light source of one's own vehicle, while 48¹ and 49¹ represent the corresponding elements of the system on the opposing vehicle, the relative position and direction of travel of the vehicles being indicated by arrows 50 and 51, all as in Fig. 3, as explained above, in detail. No further discussion regarding elliptic polarized light as applied to this invention would appear necessary for the complete understanding of the present invention except possibly that, as well recognized by those skilled in this particular art, plane polarized light is merely one limiting case of elliptic polarized light, and that, for blocking, in such systems, the axes of analyzer and light polarizer should be crossed and the sense be in opposition, while for complete transmission, these axes should be parallel, and the sense the same.

In order to briefly summarize various of the above-disclosed characteristics of the various systems above discussed, and to present such summary in a form which is compact and convenient for ready reference, the following "Table" is appended.

*Table*

| System | Neutralization of "Ghost" Interference in "Own" Windshield | | | | Visibility as Illuminated from "Own" Headlights | | | Day Driving Antiglare Features | | Viewing through "Own" and Opposing Car Analyzers | |
|---|---|---|---|---|---|---|---|---|---|---|---|
| | Angle between Incident Plane and Vibration Direction of Incident Beam | | Departure from Optimum Condition | | Extinction Angle | Theoretical Portion of Incident Reflected Beam Transmitted | | Angle between the Horizontal and the Transmission Axis of the "Own" Analyzer | Amount of Extinction of Horizontally Polarized Incident Light | Angle between Transmission Axis of "Own" Analyzer and Opposing Analyzer | Effectiveness of Blackout Effect |
| | Driver's seat | Rider's seat | Driver's seat | Rider's seat | | Polarized Light | Non-Polarized Light | | | | |
| *Degrees* | *Degrees* | *Degrees* | *Degrees* | *Degrees* | *Degrees* | *Percent* | *Percent* | *Degrees* | *Percent* | *Degrees* | *Percent* |
| −45 | 63 | 27 | 27 | 27 | 0 | 100 | 50 | 45 | 50 | 90 | 100 |
| +45 | 27 | 63 | 27 | 27 | 0 | 100 | 50 | 45 | 50 | 90 | 100 |
| −35 | 73 | 37 | 17 | 37 | 20 | 88 | 50 | 55 | 67 | 70 | 88 |
| +35 | 37 | 73 | 37 | 17 | 20 | 88 | 50 | 55 | 67 | 70 | 88 |
| −22½ | 85½ | 49½ | 4½ | 40½ | 45 | 50 | 50 | 67½ | 84 | 45 | 50 |
| +22½ | 49½ | 85½ | 40½ | 4½ | 45 | 50 | 50 | 67½ | 84 | 45 | 50 |
| −0.0 | 108 | 72 | 18 | 18 | 90 | 0 | 50 | 90 | 100 | 0 | 0 |
| +0.0 | 72 | 108 | 18 | 18 | 90 | 0 | 50 | 90 | 100 | 0 | 0 |

The various systems herein described and designated as "+" and "−" systems have significance, due to the fact that the divided windshield has its two portions differently sloped with respect to an oncoming vehicle and have, in effect, not one, but two separate and, optically considered, quite different windshields. One is, accordingly, required to either accept a compromise system, of equal value when taken in connection with each of the two halves of the divided windshield, and thus equally favor both driver and front-seat rider, or select the system of such sign as to favor the driver, and thus minimize the risk of accidents.

In the above disclosure, polarized light in general has been considered, and more specifically, Since certain changes in the constructions set forth which embody the invention may be made without departing from its scope, it is intended that all matter contained in the above description, or shown in the accompanying drawings, shall be interpreted as illustrative and not in a limiting sense.

Furthermore, it is to be distinctly understood that various changes, rearrangement of parts, modifications and adaptations may from time to time be made as convenience or practice may dictate it being expedient without in any manner whatsoever departing from the scope or interpretation of the breadth of this invention as above disclosed in the specification and drawings.

What is claimed is:

1. In an antiglare headlighting system for automotive vehicles and the like of the class wherein a vehicle includes headlights and a windshield and is equipped with means including light polarizing means for imparting to light emitted by said headlights predetermined polarization characteristics and an analyzer including light polarizing means through which the vehicle driver views the field illuminated by said headlights, the combination, with said vehicle, of means for so positioning said headlight polarizing means and said analyzer polarizing means that the transmission axes thereof are substantially symmetrically positioned in a quadrant, as defined by intersecting horizontal and vertical lines, and make with each other an angle of the order of 20°, the transmission axis of said analyzer being inclined to the vertical at an angle of the order of 35° and the transmission axis of the polarizer being inclined to the horizontal at an angle of the order of 35°, whereby a high percentage of the reflected, polarized radiation emitted by the headlights of said vehicle is transmitted by said analyzer and said analyzer also effectively suppresses ghost images of the headlights of a similarly equipped, approaching vehicle.

2. In an antiglare headlighting system for automotive vehicles and the like of the class wherein a vehicle includes headlights and a windshield and is equipped with means including light polarizing means for imparting to light emitted by said headlights predetermined polarization characteristics and an analyzer including light polarizing means through which the vehicle driver views the field illuminated by said headlights, the combination, with said vehicle, of means for so positioning said headlight polarizing means and said analyzer polarizing means that the transmission axes thereof are substantially symmetrically positioned in a quadrant, as defined by intersecting horizontal and vertical lines, and make with each other an angle of the order of 45°, the transmission axis of said analyzer being inclined to the vertical at an angle of the order of 22½° and the transmission axis of the polarizer being inclined to the horizontal at an angle of the order of 22½°, whereby a substantial percentage of the reflected, polarized radiation emitted by the headlights of said vehicle is transmitted by said analyzer and said analyzer also substantially completely suppresses ghost images of the headlights of a similarly equipped, approaching vehicle.

3. In a headlight system for automotive vehicles and the like wherein the vehicle is provided with a light source including a light-polarizing element for illuminating the pathway of the vehicle with polarized light and with a light-polarizing analyzer for viewing the illuminated pathway of the vehicle, means for positioning the analyzer so that its transmission axis makes an acute angle with the vertical of at least 22½° and not more than 35°, and means for positioning the polarizer associated with the source of illumination so that its transmission axis makes with the horizontal an angle substantially equal to the angle made by the transmission axis of the analyzer with the vertical, said transmission axes making with each other an angle of at least 20° and not more than 45°, whereby said analyzer transmits a substantial percentage, of the order of at least 50%, of the reflected, polarized radiation emitted by the headlights of said vehicle and effectively suppresses ghost images of the headlights of a similarly equipped, approaching vehicle.

4. In a headlight system for automotive vehicles and the like wherein the vehicle is provided with a light source including a light-polarizing element for illuminating the pathway of the vehicle with polarized light and with a light-polarizing analyzer for viewing the illuminated pathway of the vehicle, means for positioning the analyzer so that its transmission axis makes an acute angle with the vertical of at least 22½° and not more than 35°, and means for positioning the polarizer associated with the source of illumination so that its transmission axis makes with the horizontal an angle substantially equal to the angle made by the transmission axis of the analyzer with the vertical, said transmission axes making with each other an angle of at least 20° and not more than 45°, said light-polarizing means being so positioned that the transmission axis of each extends from upper left to lower right as viewed in the direction of travel of the vehicle, whereby said analyzer transmits a substantial percentage, of the order of at least 50%, of the reflected, polarized radiation emitted by the headlights of said vehicle and effectively suppresses ghost images of the headlights of a similarly equipped, approaching vehicle.

EDWIN H. LAND.

REFERENCES CITED

The following references are of record in the file of this patent:

UNITED STATES PATENTS

| Number | Name | Date |
|---|---|---|
| 2,031,045 | Land | Feb. 18, 1936 |
| 2,087,795 | Chubb | July 20, 1937 |
| 2,102,632 | Land | Dec. 21, 1937 |
| 2,351,797 | Young | June 20, 1944 |
| 2,359,456 | Young | Oct. 3, 1944 |

FOREIGN PATENTS

| Number | Country | Date |
|---|---|---|
| 286,394 | Great Britain | Mar. 8, 1928 |
| 482,331 | Great Britain | Mar. 28, 1938 |

OTHER REFERENCES

Brewster's Text, "A Treatise on Optics," pages 224–226, 1853, Longman, Brown, Green and Longman's, London.